United States Patent [19]
Milovancevic

[11] 3,777,976
[45] Dec. 11, 1973

[54] ELECTRONICALLY CONTROLLED WATERING

[76] Inventor: Slavko Milovancevic, P.O. Box 402, Torrance, Calif. 90508

[22] Filed: Mar. 29, 1973

[21] Appl. No.: 346,179

[52] U.S. Cl.................................. 239/64, 73/171
[51] Int. Cl.... A01g 25/00, B05b 17/04, G01w 1/14
[58] Field of Search............................ 239/63, 64; 73/170 R, 171

[56] References Cited
UNITED STATES PATENTS

| | | | |
|---|---|---|---|
| 2,989,667 | 6/1961 | Swink | 239/63 X |
| 3,224,676 | 12/1965 | Rauchweger | 239/64 |
| 3,313,939 | 4/1967 | Spencer | 239/64 X |
| 3,590,335 | 6/1971 | Tetar | 239/64 X |
| 3,626,286 | 12/1971 | Rauchwerger | 239/63 X |

*Primary Examiner*—Robert S. Ward, Jr.

[57] ABSTRACT

A pair of probes are placed in soil, the watering of which is to be controlled, the electrical resistance between the probes being a function of the moisture content of the soil. The probes are connected in the feedback circuit of an electronic oscillator, the magnitude of oscillation of the oscillator being a function of the resistance between the probes and thus the soil moisture content. The output of the oscillator is fed to a comparator circuit where it is compared with a reference voltage representing a predetermined moisture level. A control signal is generated in the comparator circuit whenever the soil moisture content is below the predetermined level during the periodic checkup, this control signal operating a warning signalling circuit. After a predetermined time has elapsed, during which a warning signal is generated, a watering control circuit is actuated which effects the watering of the soil for a predetermined period of time. In cases when manual operation is desirable or if automatic controll fails provision has been made for manually controlled operation.

5 Claims, 4 Drawing Figures

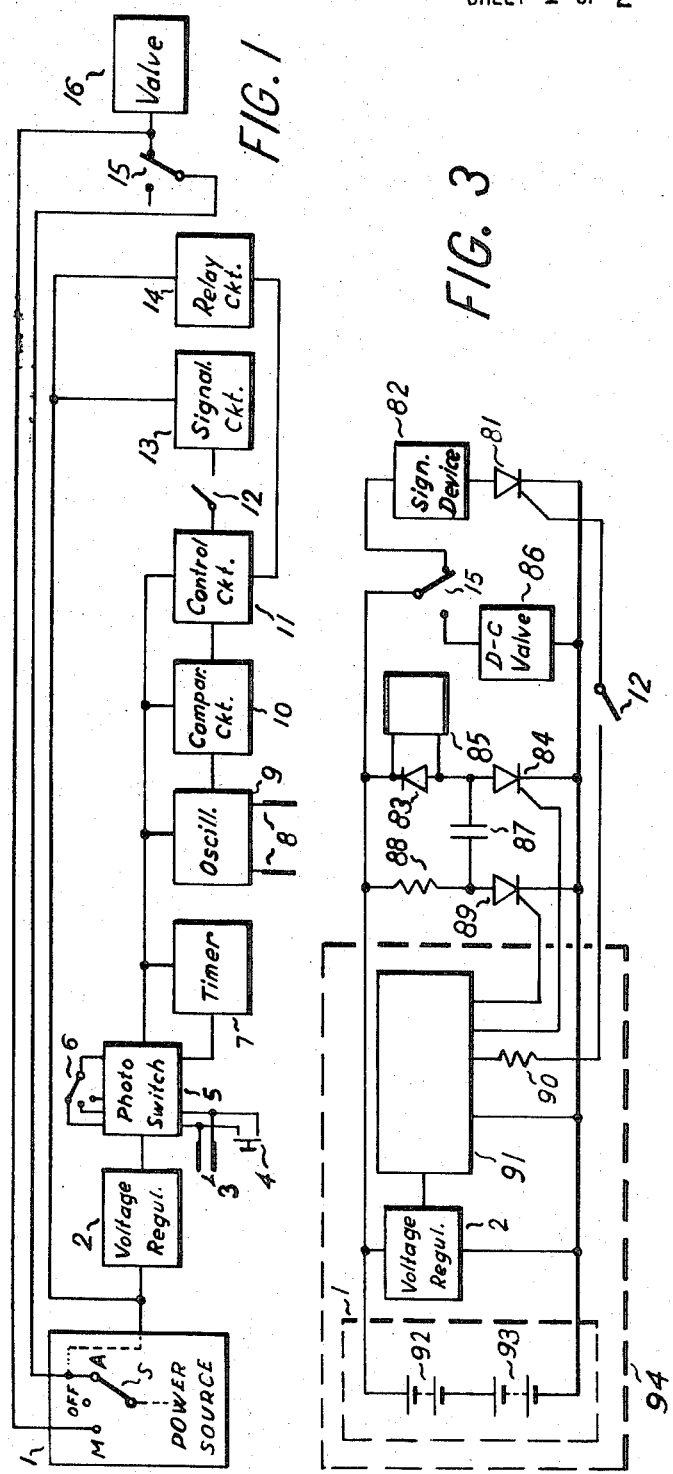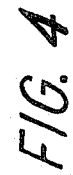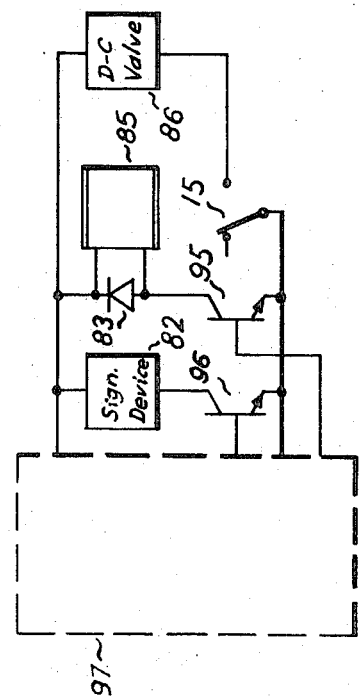

ELECTRONICALLY CONTROLLED WATERING

BACKGROUND OF THE INVENTION Invention

1. Field of the Invention

The present invention relates generally to watering systems and more particularly to solid state automatic watering systems.

2. Description of the Prior Art

There are prior art electronic type watering systems with some desirable features, but not as complete as this application is. Here are few of them:

G.P. Rauchwerger, U.S. Pat. No. . . . 3,224,676 (CL.239-64); Claude R. Tetar, U.S. Pat. No. . . . 3,590,335 (CL. 317-148.5); G.P. Rauchwerger, U.S. Pat. No. . . . 3,626,286 (CL. 324-61R).

DESCRIPTION OF THE DRAWINGS

FIG. 1 is a block diagram of the system.

FIG. 3 is a diagram in which box 1 assumes a d-c source.

FIG. 4 is a variation of FIG. 3.

DESCRIPTION OF OPERATION

Figure 2:
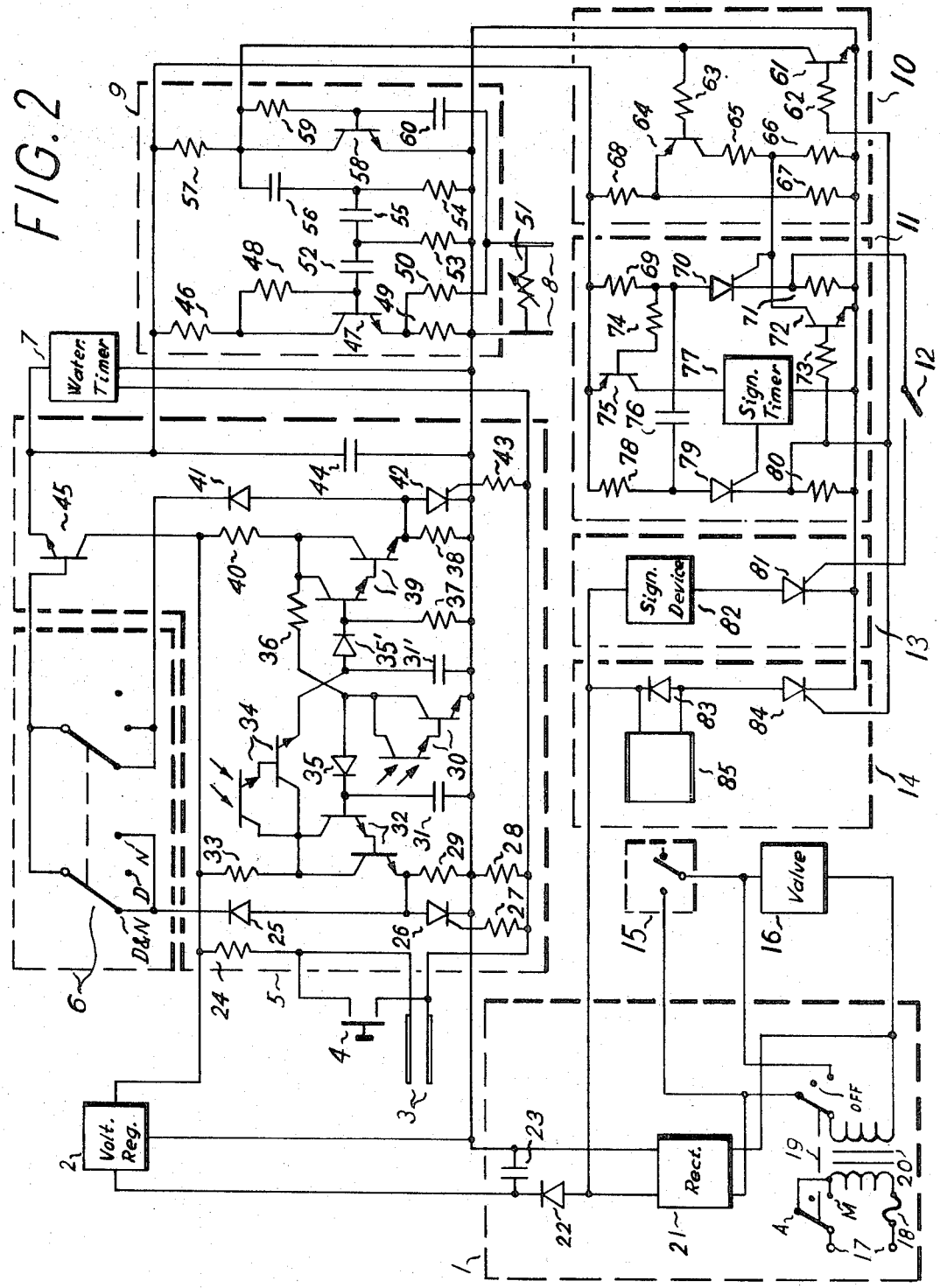
FIG. 2 is the schematic diagram where each box from FIG. 1 has been marked and box 1 assumes an a-c power source.

The objectives of this invention were: To invent a fully automated solid state system having need for periodic inspections only, and yet capable of manual operation if automatics fails, a system which will not operate while it rains or soil is moist enough, thus saving water (or in other words: it will provide watering only when nedeed), a system which will follow natural sequence of nights and days and adjust itself to constant changes, thus keep the watering under the same illumination conditions, a system that can be operated mornings only, evenings only or evenings and mornings, a system easily adapted to a-c or d-c operation, a system able to signal warning when watering is due to start after certain predetermined signalling time period is out, a system which can be easily adjusted for any watering needs and turned off if watering is in progress, a system which will require a minimum standby power or power for operation and be easily made power — failure proof if desired, a system which can be made portable, and finally, a system which can be made independent from a-c power lines and be operated in remote locations. My belief is that these aims have been achieved.

To facilitate the description of operation the boxes of the functional diagram of FIG. 1 are marked again in FIG. 2.

Referring to FIG. 1, electronically controlled watering of the present invention includes an electric power source generally designated 1, and having a switch "S" to operate the system manually "M" or automatically "A" or render it inactive "OFF," a d-c voltage regulator designated 2 to provide constant voltage, while 3 designates a pair of closely mounted conductive probes for raindrop detection, 4 designates a momentary push button switch used to interrupt the operation in progress — if desired so, box 5 indicates a photo-electronic switch responsive to night/day and day/night illumination level change and turn on and off power for operation of the respective circuits, 6 designates a switch used to select the time for operation i.e., evenings and/or mornings, box 7 represents a timer used to turn off watering after its preset timing interval, 8 designates a pair of soil probes used to sense soil resistance as the function of the soil moisture content, box 9 represents a phase-shift oscillator whose voltage of oscillation magnitude depends on moisture content in soil, box 10 a comparative and blocking circuit to sence the said magnitude, turn on the signalling and at the end of signalling period to block oscillation of oscillator 9, box 11 indicates signalling and watering control and blocking circuit, 12 designates switch used to interrupt or prevent signalling if desired so, box 13 represents signalling circuit inlcuding signalling device, 14 designates the relay circuit used to operate the relay contacts 15, which in turn activates or deactivates valve(s) 16 that effect the watering.

Again, to facilitate the description of operation an explanation using FIG. 1 alone is given. Consider first manual operation. Electric power source must have its switch "S" in the position for manual operation "M." The electric power from the power source 1 is applied directly to valve(s) designated 16 enabling it to release the water for as long as switch "S" is in the position "M." Watering is interrupted only after switch "S" is moved to position "OFF." In the case of automatic operation switch "S" must remain in the position "A" all the time. Electric power source 1 delivers d-c power to the voltage regulator 2, which provides photo-electronic switch 5 with regulated voltage for operation, photo-electronic switch 5 will turn on if night/day or day/night change occurs providing circuits 7,9,10 and 11 with power, timer 7 will then start timing preset watering interval, oscillator 9 will start oscillating having a voltage magnitude dependent on moisture content in the soil, and if the same is large enough (magnitude) will enable comparator 10 to turn on signalling and watering control and blocking circuit 11, which in turn will activate signalling circuit 13 if switch 12 is in on position, circuit 13 has a signalling device like light, sound or radio waves source, after signalling period is over timer in box 11 will turn on relay circuit 14, relay contacts 15 will close thus completing circuit for the solenoid valve(s) 16 activating the same to execute watering. At the same time signalling circuit 13 is deactivated so is the oscillator 9 by the circuit 11 for the rest of the operational cycle. Note now that timer 7 must be adjusted to a time interval equal to signalling and watering times — if signalling is used. After watering interval is over timer 7 delivers a positive turnoff pulse to photoelectronic switch 5 which remains blocked in off state until new day/night or night/day change occurs when whole cycle is repeated as just described. Once 5 is turned off circuits 7,9,10 and 11 will lack power so that circuit 14 as being driven from box 11 will be turned off also, thus relay deactivated and its contacts released and returned to original position, thus breaking the electric circuit for solenoid valve(s) and stop further watering.

Now referring to FIG. 2 a detailed description of operation will be given. Note that an alternating current source is assumed for operation and that a step-down voltage type transformer is used to supply an a-c type solenoid valve(s) and rectifier circuit.

Power source generally designated 1, includes power terminals 17, slow blow fuse 18, a power switch designated 19 of the type DPTT (double pole, triple throw) where the middle position is used as the off position, another position as position for the manual operation designated "M," and yet another position as position for automatic operation designated "A."

In the case of manual operation circuit includes also step-down type power transformer designated 20 and an a-c type valve designated 16. Switch 19 must be in position "M" so that the primary of the transformer 20 is connected to a-c source through fuse 18, one section of switch 19 and terminals 17, secondary circuit is closed through the second section of switch 19 and valve 16, while the rest of the circuitry is disconnected. Obviously, then, watering will continue for as long as switch 19 is in position "M." After a sufficient watering is performed, switch 19 is thrown in position "OFF," primary of the transformer 20 is disconnected from the a-c source, valve 16 is disconnected from the secondary of transformer 20 it lacks power and interrupts water flow; watering stops.

In the case of automatic operation, switch 19 must be in position "A" so that power from the secondary of transformer 20 is applied to a bridge rectifier generally designated 21, a blocking diode designated 22 and connected by its anode to the positive terminal of the bridge rectifier and with its cathode to a filtering capacitor designated 23 with its remaining plate connected to the common supply lead (negative terminal from the bridge rectifier). Voltage from the rectifier bridge is a rectified sine wave due to presence of diode 22, while across capacitor 23 it is a filtered rectified d-c voltage.

Voltage regulator designated 2 can be of any conventional type able to regulate sufficiently fluctuations of the filterred d-c voltage across capacitor 23. Thus filtered and regulated voltage is delivered to circuitry. An example of a simple voltage regulator is given in the manual "RCA Silicon Power Circuits Manual," 1967 edition, page 192, FIG. 211.

Box 5 includes: resistor designated 24 and connected to positive supply lead with one end, and to one out of two rain sensing probes designated 3 and also to one side of a push button switch designated 4. A diode designated 25 is connected by its cathode to switch designated 6 position D&N and N, while its cathode is connected to the anode of a Silicon Controlled Rectifier (SCR) designated 26 whose cathode is connected to the common supply lead (negative). SCR 26 has its gate electrode connected to the gate resistor designated 27 and having its remaining end connected to the remaining, before mentioned, rain probe and push button switch and also to a resistor designated 28 having its remaining end connected to said common supply lead. Note now that in case probes 3 are shorted or switch 4 is depressed, resistors 24 and 28 form a voltage divider. Resistor designated 29 is also connected to said common supply lead, while its other end is connected to anode of said SCR 26 and emitter electrode of a Darlington transistor designated 32 and having its collector connected to a collector resistor designated 33 and connected with its remaining end to positive supply lead. Between the base electrode of Darlington 32 and common supply lead a capacitor designated 31 is connected. The base of Darlington 32 is also connected to the cathode of a diode designated 35 and having its anode connected to the collector electrode of a Darlington photo-transistor designated 30, while its emitter electrode is connected to said common supply lead. Interconnection of diode 35 and Darlington photo-transistor 30 is connected to a biasing resistor designated 36 having its other end connected to another resistor designated 40 and having its remaining end connected to positive supply lead. Interconnection of Darlington 32 and resistor 33 is connected also to the collector electrode of a Darlington photo-transistor designated 34 and having its emitter electrode connected to a capacitor designated 31' and anode of a diode designated 35'. The remaining plate of capacitor 31' is connected to common supply lead, while cathode of diode 35' is connected to interconnection of a resistor designated 37 (and having its other end connected to common supply lead) and to the base electrode of a Darlington transistor designated 39 and having its collectors connected to interconnection of before mentioned resistors 36 and 40, while between its emitter electrode and common lead a resistor designated 38 is connected. An SCR designated 42 is connected to common supply lead by its emitter lectrode and to the emitter electrode of Darlington 39 by its anode to which also an anode of a diode designated 41 is connected, while it has its cathode connected to switch 6 position D&N and N (right hand side of the switch). Gate electrode of SCR 42 is connected to a resistor designated 43. Common points on switch 6 are interconnected and tied up to the base electrode of an n-p-n transistor designated 45, and having its collector electrode connected to before mentioned positive supply lead, while its emitter electrode is connected to a filtering and storage capacitor designated 44 (and having its remaining plate connected to said common lead), a watering timer inside the box designated 7 and the circuitry in boxes 9,10 and 11. Timer 7 has its common lead connected to said common lead and its output lead to interconnection of resistors 27,28 and 43 inside the box 5.

Let us mention that timer 7 can be of any electrical or electronic type able to produce a positive going pulse, to operate from a d-c source and be selfresetting. A solid state timer having small power consumption and time delay of about 1 hour would be most desirable. One such timer is, for example, described in General Electric's "Transistor Manual," seventh edition (1964), page 321, FIG. 13.31.

Functioning of boxes 5,6 and 7 can be explained now in conjunction with mentioned elements. Let us assume that a day-to-night illumination level change had occured and that switch 6 is in the D&N position. Illumination is low and photo-Darlingtons 30 and 34 are off (nonconductive), then Darlington 39 is biased near cutoff, while Darlington 32 is biased into saturation by receiving the base current through diode 35 and resistors 36 and 40. Voltage across the resistor 29 is determined mainly by values of resistors 29 and 33. Since resistor 29 is chosen with a much larger value nearly all of voltage from regulator 2 is applied through diode 25 and switch 6 to the base of transistor 45 causing it to conduct nearly in saturation and supply the circuitry with a voltage of only about 2 volts lower than voltage from regulator designated 2. This way transistor designated 45 supplies filter capacitor 44 and circuits 7,9,10 and 11 with current necessary for operation.

If, in this situation, photo-Darlingtons 30 and 34 are exposed to light for a short period of time they will become conductive. However, situation will not be changed as far as watering is concerned since capacitor 31 has been sufficiently charged to drive Darlington transistor 32 for a period of time long enough to ensure no change in operation. This is true since the collector electrode of conducting Darlington 30 is at a potential near the common, and a capacitor 31 charged near the potential from voltage regulator 2. This causes diode 35 to become reverse biased, thus non-conductive preventing capacitor 31 to discharge through photo-Darlington 30. In addition, capacitor 31' is being charged first and its voltage rises slow since it was not charged previously and conduction of Darlington 39 is delayed, but even if it would start conducting it would not harm the operation since it would do the same as Darlington 32 i.e., current through it would make conduct diode 41 and transistor 45. The only problem arising from such an event during shutoff would be skipping of an operation. This is very unlikely to happen and harm would not be severe anyway. The moment transistor 45 starts delivering power timer 7 starts timing. At the end of the timing period timer 7 delivers a positive going pulse to gate electrodes of SCR's 26 and 42 through their respective resistors 27 and 43. Darlington 39 and diode 41 are nonconductive and, practically speaking, connected in paralel with an equivalent resistance several times larger than value of resistance 38. Therefore, potential at the common point of elements 38, 39, 41 and 42 equals about one-third of the supply potential from regulator 2. In this situation gate of SCR 42 receives a trigger pulse from timer 7, but SCR 42 can not trigger into conduction since its anode current can consist from Darlington 39 and diode 41 leakage currents only, and in addition it is by-passed by the resistor 38 making this even worse, thus its anode current will be smaller than anode holding current, thus SCR 42 will not conduct. At the same time Darlington 32 is in saturation, SCR 27 receives sufficient anode current and triggers into conduction. Once SCR 26 is on potential potential at the interconnection of elements 25,26,29 and 32 will drop from near full supply voltage to approximately 1 volt (which is the saturation voltage of SCR 26). This voltage is insufficient to drive diode 25 and transistor 45, they will become very soon nonconductive and power to circuits 7, 9,10 and 11 will be cut off, circuits inoperative. This situation ends next morning when illumination becomes high enough and makes photo-Darlingtons 30 and 34 conductive causing turnoff of Darlington 32 and SCR 26. This time Darlington 39 will be biased into conduction through resistor 33, photo-Darlington 34 and diode 35'. Now diode 41 and transistor 45 receive drive current from Darlington 39 resulting in supply of power to circuits 7,9,10 and 11 as before. Timer 7 starts its timing interval and at the end of it triggers this time SCR 42 into conduction (has no effect on SCR 26) causing interruption of power supplied to circuits 7,9,10 and 11. This situation will remain unchanged untill evening when light level drops sufficiently to reverse the operation and start new cycle.

Assume now switch 6 in position D (Day). Circuit behaviour is still the same except that transistor 45 will conduct only when Darlington 39 conducts that is when illumination level is changed from night to day. Circuit will not operate when day to night change occurs since diode 25 is now disconnected by switch 6. Similarly, when switch 6 is in position N (Night) diode 41 is disconnected and transistor 45 will not conduct when change night into day occurs and it will when change day into night happens since diode 25 is connected through switch 6. The rest is same as described earlier.

Consider now functioning of rain probes 3 and momentary push button switch 4, which is essentially identical electrically. Assume transistor 45 conductive and signalling or watering in progress. Distance between probes is such that a small rain drop will suffice to cause a temporary short (or act as a small resistor across) and resistors 24 and 28 will form momentarily a voltage divider such that voltage drop across resistor 28 is sufficient for triggering into conduction SCR connected to conducting Darlington and cause interruption of operation as timer 7 does it. Regarding use of switch 4 it was already mentioned that it acts as rain probes with obvious difference that this is done manually as needed. The watering will be then postponed for some 8 to 24 hours dependent on season, illumination level and position of switch 6.

Consider now the function of timer 7 in connection with operation of box 5, regardless what is inside the box 7. As already mentioned as soon as timer 7 receives the power it starts its timing as preset. At the end of its timing period timer will send a positive going pulse to gates of SCR's 26 and 42 and trigger one of them into conduction causing interruption of watering as needed.

Circuit in box 9 consists of elements connected in the following manner: common supply lead and emitter electrode of transistor 45 from box 5 provide the power for operation to the phase-shift oscillator in box 9 where a collector resistor designated 46 and connected to positive supply lead (emitter of transistor 45 in box 5) with one end, and to collector electrode, with its other end, of an n-p-n transistor designated 47 and having its emitter electrode connected to resistor designated 49 whose other end is connected to the common supply lead. A biasing resistor designated 48 is connected between collector and base electrodes of said transistor 47. A capacitor designated 52 is connected to the base of transistor 47 as well, while its remaining plate is connected to interconnection of another capacitor designated 55 and to a resistor designated 53 having its other end connected to common supply lead. The remaining plate of capacitor 55 is connected to interconnection of yet another capacitor designated 56 and a resistor designated 54 whose remaining end is connected to common supply lead. An emitter electrode of an n-p-n transistor is also connected to supply lead, said transistor being designated 58 and having its collector electrode connected to the remaining plate of said capacitor 56 and collector resistor designated 57 with its other end connected to said positive supply lead. Between collector and base electrodes is connected a resistor designated 59. To the base of transistor 58 we find connected a capacitor designated 60 whose other plate is connected to a resistor designated 50 and having its other end connected to emitter electrode of already mentioned transistor 47. Interconnection of capacitor 60 and resistor 50 is connected to one of soil probes designated 8, while the remaining soil probe is connected to common supply lead. This is a phase-shift oscillator with slightly modified feedback loop. Here capacitors 52,55 and 56 along with resistors 46,48,53,54,57,59 and input impedances of transistors 47 and 58 define the frequency of oscillation and 180° voltage phase-shift, while transistor 58 provides voltage gain and 180° of additional phase -shift between base and collector voltages to assure positive feedback and oscillation. Transistor 47 serves only as a means of convenient voltage feedback pickup, realized using an emitter resistor 49 and in parallel with it a series combination of resistors 50 and 51 used to define amount of positive feedback, acting as a voltage divider. This voltage divider is coupled to transistor 58 by a coupling capacitor 60, thus closing positive feedback loop. Note here that resistor 51 is not a lumped resistor, a discrete component, but represents equivalent value of the soil resistance as defined by in soil moisture content at a fixed distance between soil probes 8. Obviously, after watering or rain resistance 51 has considerably smaller value, than when the soil is dry so will change amount of positive feedback directly proportional to change of moisture content. This is the reason to use soil resistance change as criterion when watering is needed and when not. Another important feature of this arrangement is that oscillator will act as a very selective filter, thus responsive to a narrow band of frequencies, and consequently not susceptive to external frequencies what means undisturbed operation. This will be better understood when one takes in consideration that magnitude of voltage of oscillation is directly proportional to moisture content in the soil i.e., to the resistance 51 which defines amount of positive voltage feedback, and also a means for pickup of voltages, existing in the soil for whatever reason. If frequency of these external voltages is close and of proper phase-shift to the oscillating frequency magnitude of oscillation could be increased and trigger watering when not needed, but it could be also decreased, thus causing watering to skip when actually needed. Frequency of oscillation is chosen to be far away from line frequency (60 cycles) and its possible harmonics, yet low enough to allow use of long leads to soil probes 8 and be independent from distributed reactances along them. Finally, resistors 48 and 59 are used to determine the quiescent operating point for transistors 47 and 58 along with resistors 46 and 57, 49,50 and 51 and d-c betas of transistors 47 and 58, respectively.

Circuit in box 10 consists of the following elements: Collector of transistor 58 from box 9 is connected to collector of an n-p-n transistor designated 61 and having its emitter connected to common supply lead, while its base is connected to a resistor designated 62 and having other end connected to resistor 80 in the box 11. Emitter electrode of transistor 45 in box 5 supplies power also to boxes 10 and 11 representing positive supply lead. Between the positive supply lead and common supply lead a voltage divider is connected consisting of series connection of resistors 67 and 68, resistor 68 being connected with one terminal to positive supply lead, and resistor 67 being connected with one end to common supply lead. Interconnection of resistors 67 and 68 is connected also to an emitter electrode of a p-n-p transistor designated 64 and having a resistor designated 65, in its collector, with its other end connected to a resistor designated 66 whose remaining end is connected to common supply lead. Base electrode of transistor 64 is connected to a resistor designated 63 while remaining end of it is connected to collector electrode of transistor 61. If magnitude of voltage of oscillation is sufficiently large it will surpass reference voltage plus base to emitter voltage of transistor 64 and turn it on developing enough voltage across resistor 66 to turn SCR 70 on (box 11). Transistor 61 is turned on when appropriate drive from box 11 is applied to its base at the moment watering starts so that 61 enters saturation and blocks oscillation of oscillator 9.

Circuit of box 11 consists of the following elements: Resistor designated 69 connected with one end to positive supply lead and with its other end to anode electrode of an SCR designated 70 whose cathode electrode is connected to a resistor designated 71 and having its other end connected to the common supply lead. Gate electrode of SCR 70 is connected to interconnection of resistors 67 and 68 in box 10. Interconnection of SCR 70 and resistor 71 is connected to one side of switch designated 12 (outside of the box 11). Resistor designated 78 is connected to positive supply lead and with its remaining end to the anode electrode of an SCR designated 79 whose cathode electrode is connected to a resistor designated 80 and having its other end connected to common supply lead. Interconnection of resistor 80 and SCR 79 is connected also to a resistor designated 73 and having its other end connected to the base electrode of an n-p-n type transistor designated 72 and having its emitter electrode connected to said common supply lead and its collector to the gate electrode of SCR 70. Between anode electrodes of SCR's 70 and 79 is connected a commutating capacitor designated 76. Anode electrode of SCR 70 has connection to a base resistor designated 74 whose other end is connected to the base electrode of a p-n-p transistor designated 75 and having its emitter electrode connected to positive supply lead, and its collector electrode to a signaling timer designated 77, and connected also to common supply lead in order to receive power for operation, while its output is connected to the gate of SCR 79. Signalling timer 77 is of same type as timer 7 and same note is valid here as well. Circuitry in box 11 serves to turn on signalling, perform timing for signalling, turn on relay circuit (start watering) and at the same time turn off signalling, block it and drive transistor 61 to block oscillator, box 10 and 9 respectively. This is performed in the following manner: Oscillator 9 turns on comparator 10 which then turns on SCR 70 by means of a positive pulse at its gate. Now voltage drop across resistor 69 forward biases transistor 75 which saturates supplying power to timer 77 to start timing signalling interval. Signalling circuit 13 will also turn on if switch 12 is closed due to voltage drop across resistor 71. Capacitor 76 will be charged to a potential being the difference of voltages supplied from transistor 45 and by the voltage divider formed by resistor 69 and 71 (disregarding the voltage drop across SCR 70 which is on) with its plate connected to SCR 70 charged negative. At the end of signalling period timer 77 will send a positive signal to gate of SCR 79, turn it on so that the same instant charged capacitor 76 is connected between the two equal potentials (because resistor 78 equals 69, and resistor 80 equals 71) so that anode of SCR 70 will decrease its potential toward ground and beyond it in negative direction as defined by potential of charged capacitor 76, thus decreasing anode current of SCR 70 below its holding value, and resulting in its turnoff. Now voltage drop across resistor 69 equals zero, transistor 75 will turn off and cut power to timer 77. Voltage drop across resistor 71 will drop to zero, signalling circuit will lack drive and turn off, thus stop signalling. Capacitor 76 will be now charged with a polarity opposite to previous one. Voltage drop now dveloped across resistor 80 will forward bias transistors 61 and 72 which will block oscillations of oscillator 9 and the gate circuit of SCR 70, thus signalling circuit respectively. Said voltage drop will turn on also relay circuit, thus activating watering. At the end of watering interval timer 7 will turn off switch 5, thus power from circuits 7,9,10 and 11, thus also the drive signal for relay circuit will be deactivated and watering will stop.

Box 13 includes an SCR designated 81 and its load in form of a signalling device like light bulb, bell, transmitter or any convenient and designated 82. Note here that circuit is supplied from a d-c pulsating source i.e., rectifier bridge 21 in box 1. This fact means that SCR 81 will turn off as soon as its anode voltage drops near zero volts if there is no more drive signal from box 11, and on if anode voltage is sufficiently high and gate drive supplied from box 11.

Box 14 includes an SCR designated 84, surge protection diode designated 83 and relay coil designated 85. SCR 84 is driven from the box 11 just like box 13, only at a different time and from a different point. Supply is the same as for box 13. Turn on and off of SCR 84 is in exactly same manner as for SCR 81. When energized relay 85 will pull in its contacts designated 15, thus closing circuit for solenoid valve(s) designated 16, energizes it and watering starts. When SCR 84 is turned off relay 85 opens circuit for valve(s) 16, stops watering, colapsing magnetic field around its coil induces current in the same direction as when energized, but since SCR 84 is off current path will be closed through diode 83, thus preventing surge and possible damage to circuitry.

Solenoid valve(s) is in this case of a-c type and supplied from the power transformer designated 20, in box 1.

Referring now to FIG. 3 note immediately that box 1 includes two d-c batteries designated 92 and 93 and representing a d-c power source. Boxes and elements designated 2,3,4,5,6,7,8,9,10,11 and 12 are same as in FIG. 2 and all except box 2 are represented by a block designated 91. Box 13 is also same as in FIG. 2 only its connection to power source differs from the one in FIG. 2. Its turnoff is now effected by energizing relay in relay circuit when watering starts, while its turn on is same way as before. Relay circuit contains now besides components 83,84 and 85 also a capacitor designated 87, two resistors designated 88 and 90, and SCR 89. Turn on of SCR 84 is in exactly same way as in FIG. 2, but its turnoff is effected using additional SCR 89, its gate resistor 90, anode resistor 88 and commutating capacitor 97. One additional note is needed, namely, that resistor 90, thus gate of SCR 89. is supplied by turnoff (positive) pulse from timer 7 at the end of watering interval. Thus, resistor 90 is connected to output of box 7 or to common point of resistors 27,28 and 43, to one of rain probes 3, and one side of switch 4. Obviously when relay 85 pulls in its contacts 15, power is disconnected from signalling components 81 and 82, and connected to d-c type solenoid valve(s) 86, watering starts. At the end of watering interval relay is deenergized releases its contacts 15 disconnecting solenoid valve(s) 86 and watering stops. Signalling components 81 and 82 have now supply voltage again, but drive signal is cut at the same time as watering had started so that signalling now remains still.

Finally referring to FIG. 4 box 97 includes all of the box 94 from FIG. 3 but resistor 90 which is unnecessary in this case. Now instead of SCR 81, FIG. 2 an n-p-n transistor designated 96 is used, and will turn on only in presence of the drive signal from box 11. In much the same manner SCR 84, FIG. 2 is replaced by another n-p-n transistor designated 95 which energizes the relay 85 only in presence of the drive signal from the box 11.

There are also other possibilities pertinent to this invention and apparent to those skilled in the art - yet all within the scope of the invention.

I claim:

1. Electronically controlled watering comprising:
   a pair of probes placed in the soil, the electrical resistance between said probes being a function of the moisture content of the soil,
   an electronic oscillator, said probes being connected in the feedback circuit of said oscillator whereby the magnitude of the voltage output of said oscillator is proportional to the soil moisture content,
   means for generating a reference voltage representing a predetermined moisture content,
   means for comparing said reference voltage with the voltage output of said oscillator and generating a control signal whenever the moisture content of the soil falls below the moisture content represented by the reference voltage, and
   means responsive to said control signal for controlling the watering of the soil.

2. The system of claim 1 and further including a signalling circuit responsive to said control signal for generating a watering warning signal during a predetermined time period, said means for controlling the watering of the soil being operative after said time period has elapsed.

3. The system of claim 1 wherein said means for controlling the watering of the soil includes a watering control circuit and relay means responsive to the control circuit for effecting the watering action, said control circuit actuating said relay means during a predetermined time period.

4. The system of claim 1 and further including means for sensing the presence of rain on said soil and preventing the watering of the soil whenever a rain condition exists.

5. The system of claim 3 and further including means for sensing day to night and night to day change in the ambient light level and inhibiting the operation of said watering control circuit at all times except during a period of time after such a change has been sensed.

* * * * *